United States Patent [19]

Poli

[11] Patent Number: 5,788,026

[45] Date of Patent: Aug. 4, 1998

[54] BRAKE DISC ASSEMBLY FOR A ROTATIONAL BODY

[75] Inventor: Antonio Poli, Romanengo, Italy

[73] Assignee: Poli Officine Meccaniche S.p.A., Romanengo, Italy

[21] Appl. No.: 693,968

[22] Filed: Aug. 7, 1996

[30] Foreign Application Priority Data

Aug. 7, 1995 [IT] Italy .................. MI95A1753

[51] Int. Cl.⁶ ............................................. F16D 65/12
[52] U.S. Cl. .................... 188/218 XL; 188/58; 188/73.2
[58] Field of Search .................... 188/218 XL, 218 A, 188/58, 59, 73.2, 366, 367, 250 B, 250 G; 192/107 R, 107 T, 70.13; 295/43, 8

[56] References Cited

U.S. PATENT DOCUMENTS

| 4,132,294 | 1/1979 | Poli | 188/218 |
|---|---|---|---|
| 4,199,044 | 4/1980 | Ivens et al. | 188/218 XL |

FOREIGN PATENT DOCUMENTS

| 3436729 | 4/1986 | Germany | 188/218 XL |
|---|---|---|---|
| 38 05 498 | 8/1989 | Germany. | |
| 4114090 | 11/1992 | Germany | 188/218 XL |
| 43 08 910 | 9/1994 | Germany. | |
| 1 510 619 | 5/1978 | United Kingdom. | |

*Primary Examiner*—Douglas C. Butler
*Attorney, Agent, or Firm*—IP Group of Pillsbury Madison & Sutro LLP

[57] ABSTRACT

A rotational element, to be braked, is provided on two opposite sides with braking discs. Each of the braking discs is constituted by an odd number of at least three segments. There are elements rigidly joining the segments together, elements rigidly fixing the segments to the rotational element and elements rigidly joining together the discs arranged on opposite sides of the rotational element. The rotational element includes a hub and a rim, joined by a web. In a preferred embodiment, the web includes a first radial region of greater rigidity located closer to the hub and a second radial region of lesser rigidity located closer to the rim. In these regions there are provided respective series of through apertures. The braking discs are secured to the rotational element in correspondence with the more rigid radial region. The rotational element can be provided as a central portion of a larger structure, or as an actual wheel, such as a railway wheel.

13 Claims, 6 Drawing Sheets

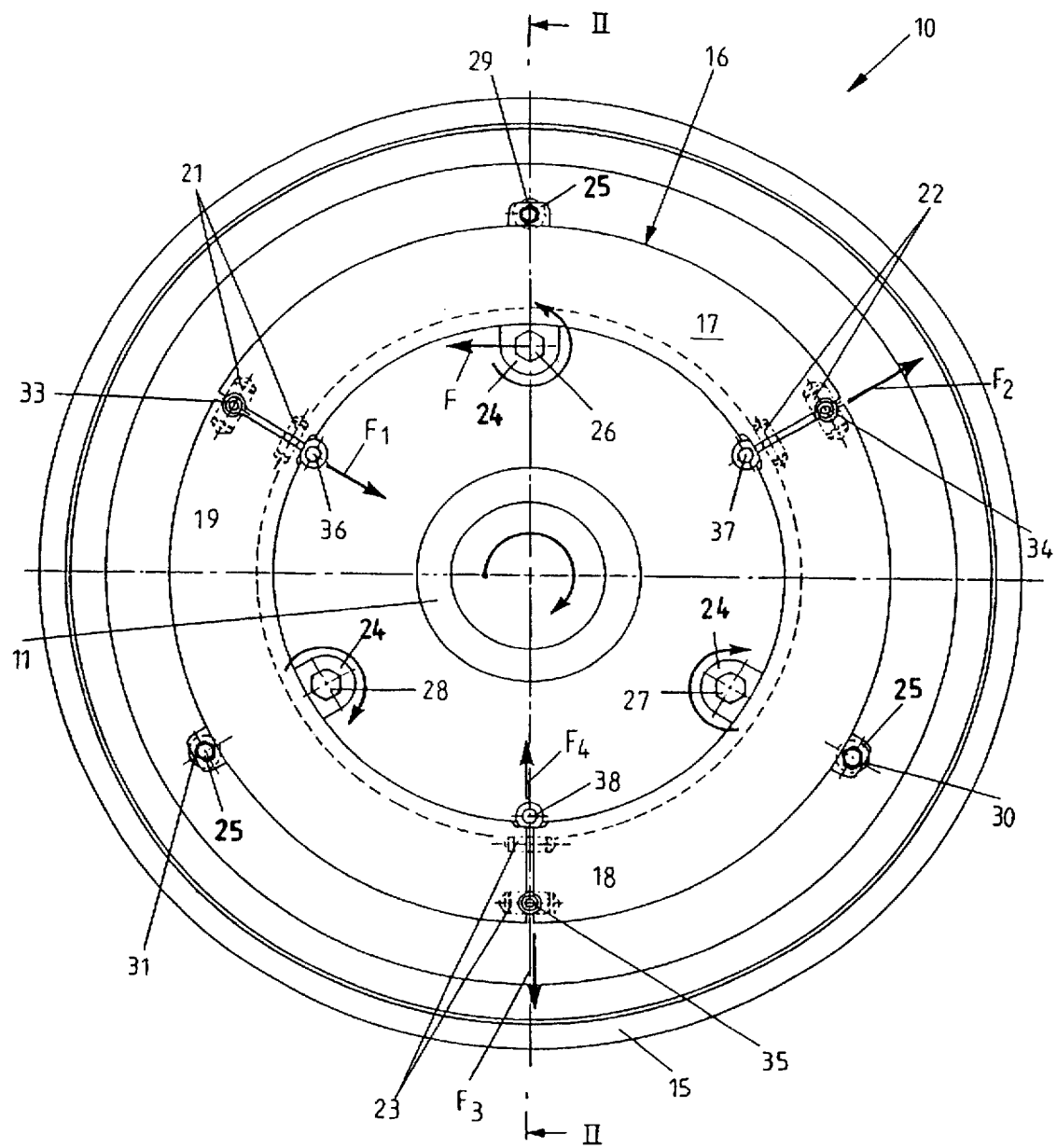

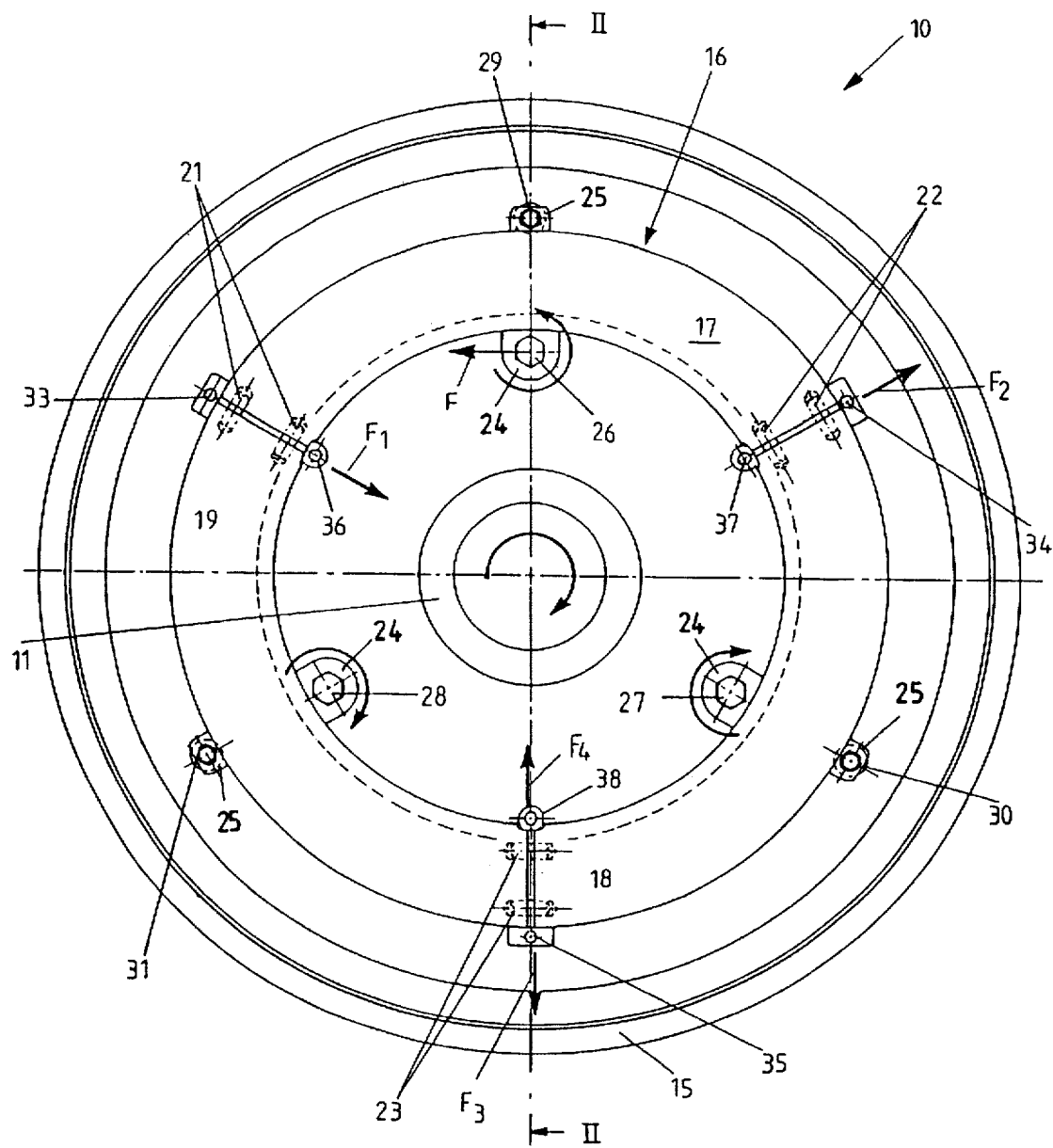

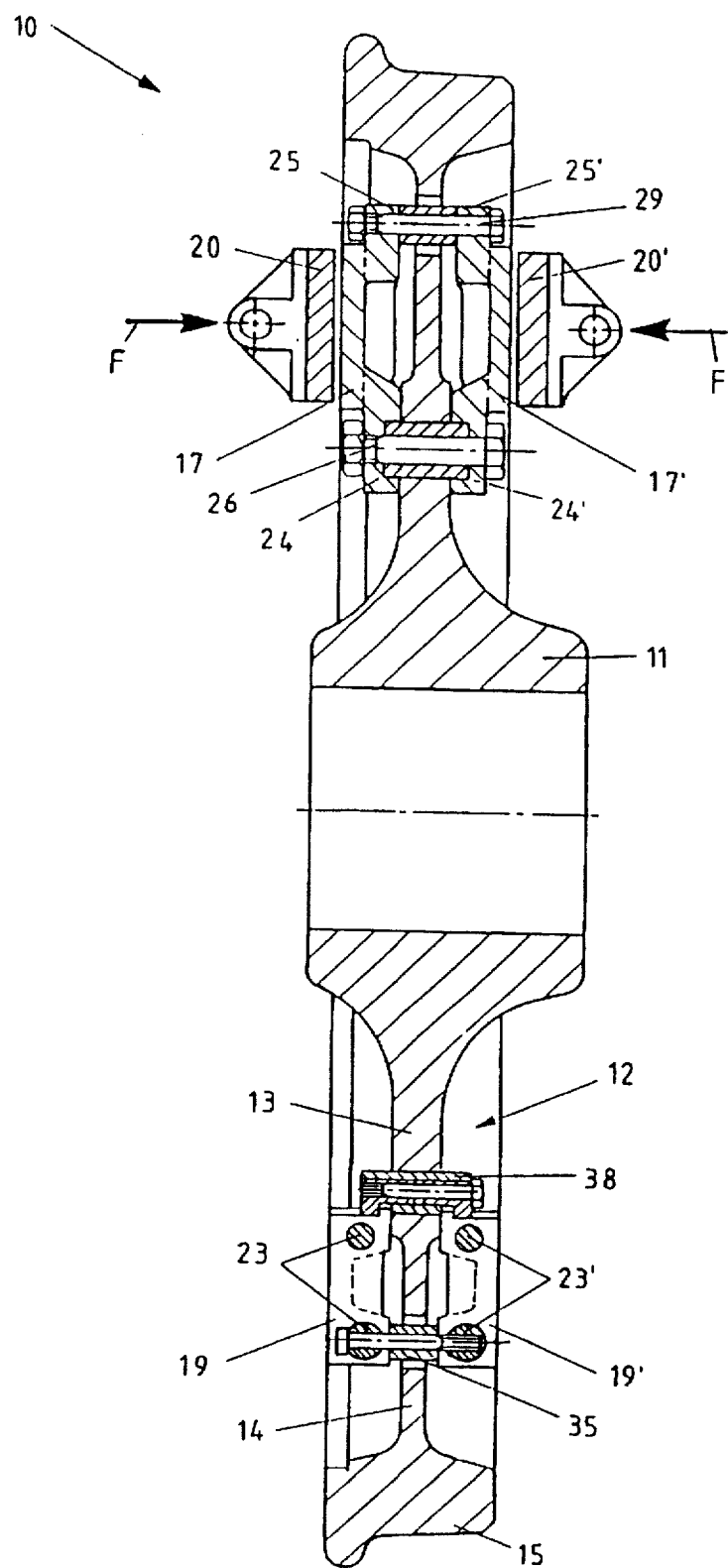
Fig. 2-A

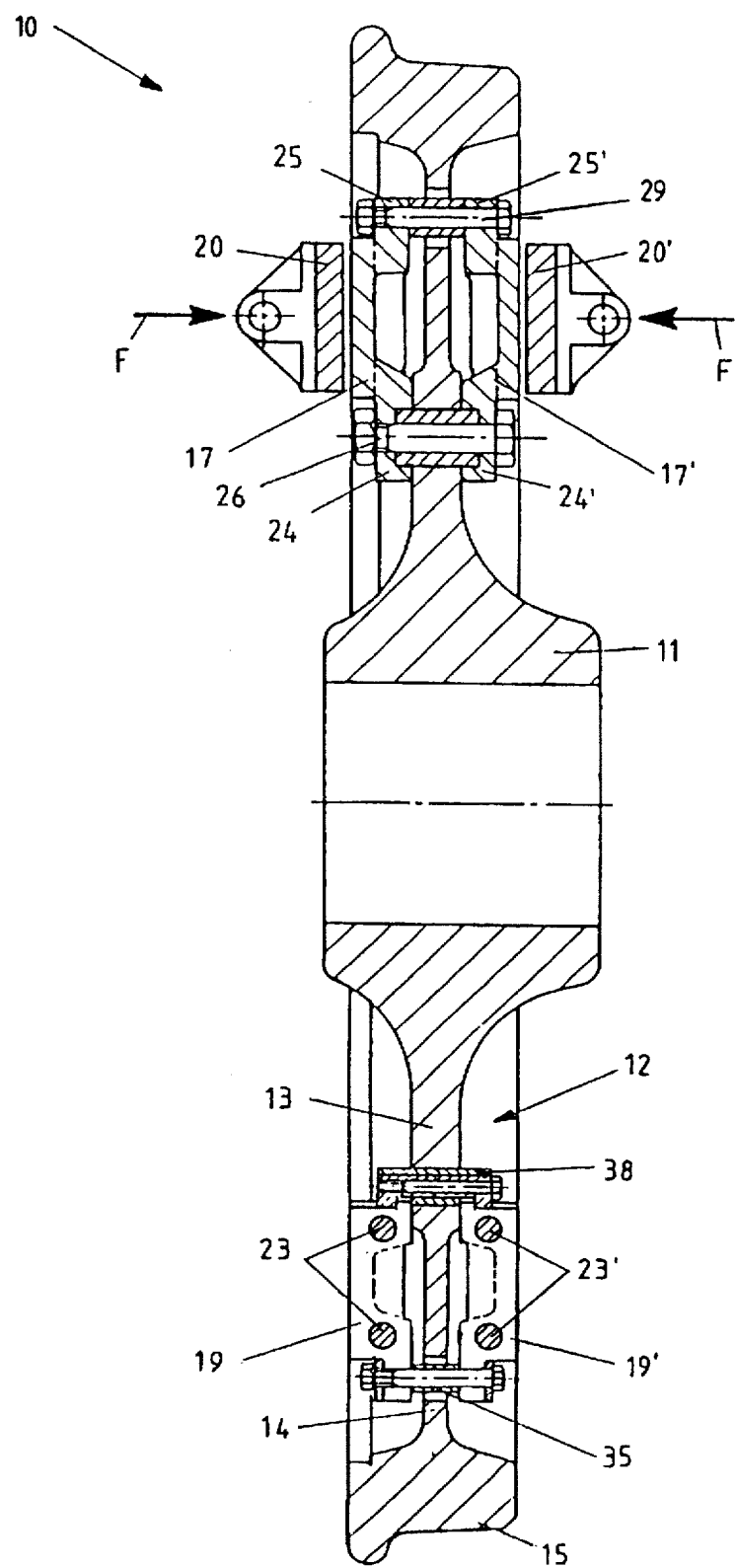
Fig. 2-B

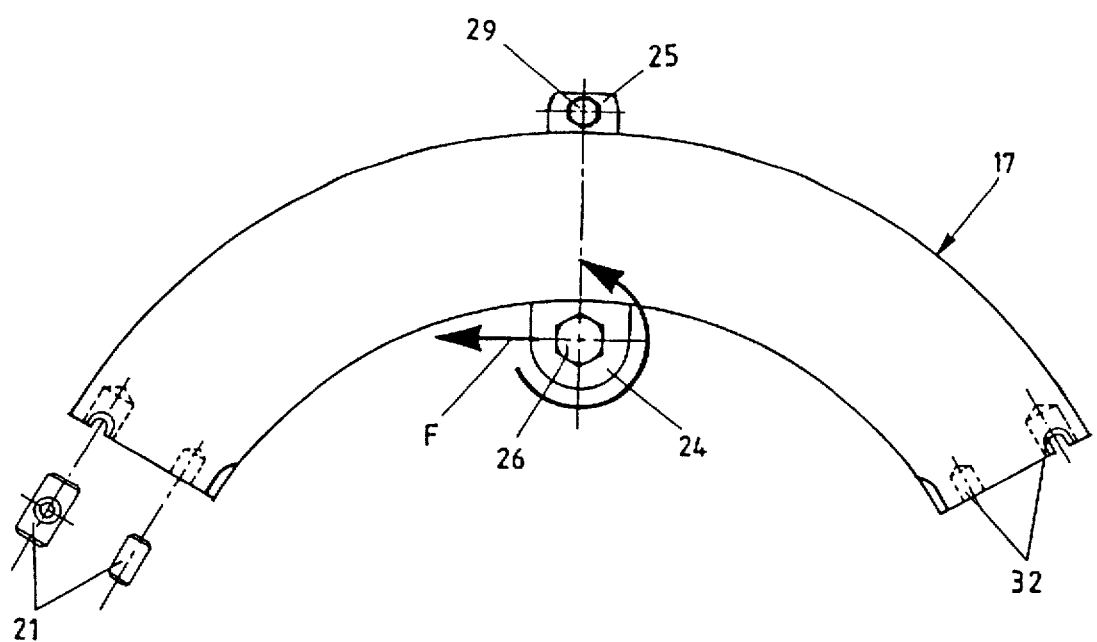
Fig. 3-A

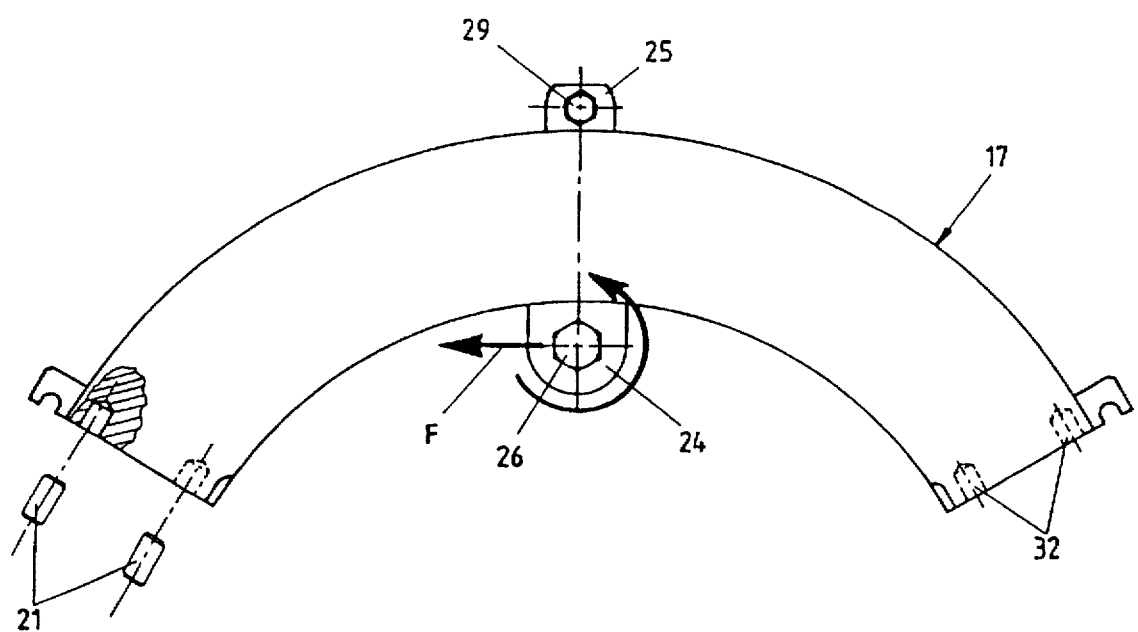

BRAKE DISC ASSEMBLY FOR A ROTATIONAL BODY

BACKGROUND OF THE INVENTION

This invention relates to a rotary support to be braked, in particular for railway use, provided with ring-type braking discs and elements which connect them together, the rotary support to be braked being in particular a hub or a wheel of a railway vehicle. Such supports are known both in the form of a simple hub on which a disc is fixed comprising two annular flat friction surfaces or tracks, and in the form of a railway vehicle wheel, on the surfaces of which there are fixed two discs, each again comprising an annular flat friction surface or track.

The linkage between the disc and discs and the hub or wheel is made by keying and screwing the parts together, this linkage being elastic or movable on guides, as the disc becomes hot when subjected to braking and undergoes different degrees of expansion relative to the hub or wheel.

If an elastic linkage is used, the various parts are rigidly secured to the rotary support by making the linkage thin and long to deform elastically, however as the spaces within which the system is compelled to lie are small, these linkages are not sufficiently elastic and remain weak, to fracture by fatigue. If however, linkages movable on guides are used, the reciprocating movement produced causes wear and consequent noise, the wear being irreparable.

Other such rotary supports are known in which the discs, instead of being whole or composed of two halves joined rigidly together by screws, are each divided into two segments spaced apart by a space which enables them to expand. Each disc segment is linked to the hub or wheel by screws and bushes which are partly rigid and partly elastically deformable.

Suitable behavior is however, again not achieved in such assemblies because if the segments are too tightly fixed they break by the expansion due to the braking heat, whereas if they are not tightly fixed the segments move during braking because of the action of the brake shoes which pass firstly along one and then along the other segment of the disc, resulting in noise and irreparable wear.

In these known systems and particularly in the case of a railway wheel, there is also the defect that when the braking discs are fixed to the wheel hub, the entire system becomes very heavy. There is hence a considerable increase in the unsuspended mass, resulting in serious damage during operation.

In contrast, in the case of systems with braking discs fixed to the web and/or the wheel tread, as these have to follow the considerable flexure of the wheel occurring round a bend due to the thrust on the wheel flange, they fracture by fatigue, it indeed being possible for the wheel to break by fatigue as a result of the constraint caused by the discs.

If to obviate this deformation, the thickness of the wheel web is thickened, the wheel can become excessively rigid, causing excessive wear of the flange of the wheel tread, so that it has to be replaced prematurely.

SUMMARY OF THE INVENTION

An object of the present invention is to obviate the aforesaid drawbacks of the known art together with others which have not been stated.

A further object of the present invention is to provide a rotary support to be braked, such as a hub plus web or a wheel for a railway vehicle, the life of which is not limited by the application of braking discs.

A further object of the present invention is to provide said rotary support with a braking element, in particular in the form of braking discs, which can be easily mounted on and demounted from the rotary support, which is effective in terms of its braking action, which reduces mechanical fatigue, allows effective heat dissipation, is light in weight and can be used to its wear limit.

A further object of the present invention is to configure the braking discs to achieve easy and economical construction, together with simple integration into the profile of the rotary support, hence limiting to a maximum extent their overall size compared with the vehicle transmission members.

These and further objects are effectively attained by a rotary support to be braked, for railway use, provided with a pair of ring-type braking discs, each disc of the pair of discs being arranged on a respective side of the rotary support, each of the braking discs consisting of several segments, there being provided elements for rigidly joining the segments together, elements for rigidly fixing the segments to the rotary support and elements for rigidly joining together the discs arranged on opposite sides of the rotary support, the support consisting at least of a hub and a web radially external to the hub and rigid with it, the web—in the case of a railway wheel—comprising a first radial region of greater rigidity towards the hub and a second radial region of lesser rigidity towards the tread, in both of those radial regions there being provided a respective series of through apertures, the braking discs being secured to the rotary support in correspondence with the radial region towards the hub, the constituent segments of each of the braking discs being provided in an odd number other than 1.

In a railway vehicle wheel, the formation of the web as two radial regions or bands of different rigidity (obtainable either by different material thicknesses or possibly by materials of different characteristics) enables, for equal total masses, a wheel to be obtained with the flexibility to withstand the forces deriving from the running of the vehicle, while at the same time comprising a suitable region towards the hub for the fixing of the braking disc or discs which is of sufficient rigidity such that they deform only to a limited extend so as not to undergo fracture by fatigue, and a region towards the tread of lesser rigidity, provided with spaces towards the facing braking discs and their connections, so as not to interfere with them under any vehicle running condition.

The two braking discs are divided into the same odd number of facing segments.

Each segment has its braking surface on its frontally outer side and, on its opposite side, cooling and connection appendices, one of which is arranged for its bolt fixing to the web in that region towards the hub and to the facing segment, and others are arranged radially inwards and outwards for its connection to the facing segment.

These bolted and non-bolted connections between an individual segment and the web and between facing segments are made via the respective series of through apertures, of which the former are made via the apertures provided in the radial region towards the hub and the latter are made via the apertures provided in the less rigid region, or external to the web if it does not form part of a wheel.

The segments are arranged with the radially inner appendices resting on one and the other side of that region of the radial web towards the hub and are disposed on each side with circumferential spaces between them to prevent them touching during heat expansion. Together with the axially outer surfaces they form the friction tracks for the brake shoes.

The segments of each individual braking disc are connected together by axially slidable bodies, such as pins, arranged in facing dead holes in the circumferential spaces separating them. These holes are of greater depth than the pins to enable the segments to undergo expansion by heat.

Besides maintaining the segment surfaces mutually level during braking, these bodies enable the braking force of each segment to be transmitted to the braking disc complex. In their turn the bolt connections positioned in the radially inner appendices of the segments transmit the braking force of the braking discs to the rotary support.

Dividing the braking disc into a plurality of segments enables the braking disc to be constructed more economically, because the disadvantages of having a greater number of pieces and hence of having to arrange a greater number of connections between the pieces are vastly outweighed by the advantages deriving from the fact of being able to construct them with greater precision and lesser cost, in view of their smaller dimensions.

BRIEF DESCRIPTION OF THE DRAWINGS

Further advantages and characteristics of the present invention will be more apparent from the description given hereinafter. It is of descriptive character and makes reference to the accompanying drawings of embodiments A and B, which are provided by way of non-limiting example, and in which:

FIGS. 1A and 1B are side views respectively of embodiments A and B of a rotary support with braking discs according to the present invention, where the rotary support is a railway wheel;

FIGS. 2A and 2B are sectional views, respectively on lines 2A—2A and 2B—2B of the rotary support with braking discs of FIGS. 1A and 1B;

FIGS. 3A and 3B respectively are detailed views, each of a part of the rotary support with braking discs of FIGS. 1A and 1B.

DETAILED DESCRIPTION

Hereinafter when figures are mentioned, these relate to both embodiment A and embodiment B.

In FIGS. 1A, 1B, 2A and 2B, the reference numeral 10 indicates overall a railway vehicle wheel. The wheel 10 consists of a hub 11, external to which in the radial direction there is a web 12 divided into two concentric bands or regions, of greater rigidity 13 and of lesser rigidity 14, respectively. In the illustrated embodiments, the rigidity of the two bands or regions 13 and 14 depends on the material thickness, the greater rigidity region 13 having a larger thickness than the region 14. In other cases, not shown herein, different rigidity of the two regions can be achieved by means of two different materials and hence with a different modulus of elasticity, and in still further cases an intermediate solution can be used with different materials of different thicknesses. In the case of regions of different materials, the greater rigidity region is formed of material having a modulus of elasticity lower than the region of lesser rigidity. External to the web 12 there is the tread 15, which, in use rests with its flange on a rail (not shown).

In correspondence with the region of greater rigidity 13, a series of circumferential arc segments 17, 18 and 19, three in number in this case, form the braking disc 16. These three segments, with their respective outer surfaces, define a braking track for the sliding of a respective shoe 20 and 21', operated by mechanisms which are not further described herein. On the other side of the wheel 10, not visible in FIGS. 1A and 1B and only partly visible in FIGS. 2A and 2B, a further three constituent segments of a braking disc are applied in exactly corresponding positions. For simplicity, in the ensuing description, these segments will be given the reference number of the corresponding visible segment followed by a prime. Likewise, every other element corresponding to an element visible in FIGS. 1A and 1B by lying identically on the non-visible side of the wheel 10 will be indicated by the same reference numeral as FIGS. 1A and 1B followed by a prime.

The number of component segments of the braking disc 16 of the present invention must be an odd number other than one. In this manner, as will be further explained hereinafter, perfect balance is attained between the forces acting on the component segments 17, 18 and 19 of the braking disc 16.

The segments are separated one from another by a circumferential free space so that they can freely expand or contract depending on the temperature. The three segments 17, 18 and 19 are joined to each other at these free spaces by axially sliding elements or pins 21, 22 and 23 arranged in holes 32 facing the circumferential spaces which separate them, the holes having a greater depth than the elements. In this manner, linkages movable on guides are formed.

With reference to FIGS. 3A and 3B, it can be seen that each constituent segment 17, 18 and 19 of the braking disc 16 is provided, in a virtually central position in correspondence with radially inner curved portions of it, with an appendix 24 comprising a hole. The bolt connection elements (indicated by the reference numerals 26, 27 and 28 respectively in FIGS. 1A and 1B) are inserted through the relative inner appendices 24 to rigidly fix the respective segment 17, 18 and 19 to the corresponding segments 17', 18' and 19' and to the web 12, elements (indicated in FIGS. 1A and 1B by the reference numerals 29, 30 and 31 respectively) for rigidly joining the segments 17, 18 and 19 positioned on one side of the wheel 10 to the segments 17', 18' and 19' positioned on the other side being inserted through the radially outer appendices 25.

With reference to FIGS. 1A, 1B, 2A and 2B, it can be seen that each constituent segment 17, 18, 19 of the braking disc 16 is provided in its end positions in proximity to the radially opposing curved portions of the segment with elements 33, 34, 35 and respectively 36, 37, 38 for joining together the mutually facing segments. Suitable spacers, such as those shown in the figures, can be associated with all the joining elements.

The more and less rigid bands 13, 14 of the web 12 of the rotational body 10 are shown provided with a first series of axially extending apertures, in two sets 101, 102, and a second series of axially extending apertures, also in two sets 103, 104, the openings 101, 104 being through the band 14 and the openings 102, 103 being through the band 13.

The brake disc segments 17, 17', 18, 18', 19 and 19' of the two brake discs 16, 16' are mounted to the rotational body, and corresponding segments on opposite sides of the rotational body are secured to one another, by various engagement elements which extend through the respective apertures 101–104.

On each side of the rotational body, the gapped ends 105, 106 of the brake disc segments which neighbor one another angularly of the rotational axis of the rotational body, idle., in the circumferential direction, are jointed by pins 21, 22, 23 which are slidingly received in sockets 32 which open through the corresponding ends 105, 106. At each end, two sockets 32 are shown provided, one closer to and another further from the rotational axis of the rotational body. The outer two sockets of two confronting ends 105, 106 align, as to the inner sockets of those ends. The pins 21 slidingly received in the respective pairs of aligned sockets are each shorter than the combined lengths of the respective pair, given the normal spacing between the respective two ends 105, 106.

Each connecting element installed through an opening 101 in the web band 14 is shown including a bolt and nut assembly 29, 115 installed through the corresponding sector appendices 25, 25' and a spacer bushing 114 freely positioned in a respective opening 101.

Each connecting element installed through an opening 102 in the web band 13 shown including a bolt and nut assembly 111, 113 installed through the corresponding sector appendices 24, 24' and a bushing 112 positioned without radial spacing around it in the respective opening 102.

The sector appendices 24, 24', 25 and 25' are located radially off the respective brake disc brake pad engagement tracks, midway between the ends 105, 106 of each respective segment.

Each connecting element installed through an opening 103 in the web band 13 is shown including a clamp having opposed jaws 109, 109' which engage shoulders on corresponding sectors and are drawn together by a bolt 110.

The embodiment A shown in FIGS. 1A, 2A and 3A differs from the embodiment B shown in FIGS. 1B, 2B and 3B in relation to details of each connecting element installed through an opening 104.

In the embodiment A, each radially outer pin 21, 22, 23 has an opening 121 provided transversely therethrough and each radially outer pin 21', 22', 23' has an opening 121' provided transversely therethrough. The openings 121' of each pair of openings 121, 121' which are aligned axially of the rotational body 10 on opposite sides of the web band 14, is internally threaded. A bolt 107 is installed through the opening 121 in one of the pins of a pair, through a spacer bushing 108 freely received in the respective opening 104, and threaded into the opening 121' in the other of the pins of the respective pair.

In the embodiment B, each brake disc sector is shown provided with a C-shaped appendage 122 or 122' on its radially outer side at each of its ends, opening toward the respective end 105, 106, such that when the parts are assembled as shown, the notches of each two confronting appendages 122 cooperatively form an opening 123 and the notches of each two confronting appendages 122' cooperatively form an opening 123'. A bolt 107 is installed through the opening 123, a spacer bushing 108 and the opening 123', and has a nut 124 threaded thereon to secure the nut and bolt assembly 107, 124 against the respective four appendages 122, 122'.

Because the bushings 114 and 35 are spacer bushings freely received with radial spacing in the radially outer openings 101, 104 which are provided in the web band 14, the respective connecting elements primarily serve to fasten the respective brake disc sectors to one another on opposite sides of the rotational body, respectively at midpoints and ends of the respective sectors.

However, comparable spacing is not provided for the connecting elements which connect the respective brake disc sectors through the openings 102 and 103 which are provided in the web band 13; these connecting elements also serve to fasten the brake disc sectors against opposite sides of the rotational body 10.

The mechanism by which the braking force is distributed equally between the two halves of the braking disc, to then be totally transferred to the wheel, is explained below.

When a braking force F is applied to the pair of facing segments 17-17', this pair of segments pivoted at 26 transmits to the segments 18-18' and 19-19' a respective force F1, F1' and F2, F2' via the elements 21 and 22 (or 21' and 22') respectively. As these two pairs of facing segments 18-18' and 19-19' are pivoted on the web 12 at 27 and 28 respectively, these forces F1, F1' and F2, F2' are transmitted by the segments 18-18' and 19-19' to the elements 23 and 23' in opposite directions one segment to the other in the form of forces F3, F3' and F4, F4'. In other words, the two forces F3, F3' and F4, F4' have equal but opposite vectors. In this manner, the assembly forming the braking discs 16 and 16' becomes self-locked and responds as a single body to the force of the brake shoes, the wheel 10 remaining braked via the connection bolts 26, 27 and 28.

The braking tracks of the segments of each disc 16, 16' are preferably free of holes and can withstand considerable thermal transients without the formation of cracks during braking, which the presence of holes would favor. However if for space reasons such holes are present, the same result can be achieved if thee holes are suitably flared and provided with a circumferential interruption in that region contacted by the brake shoes. In this manner, during braking there is a lesser concentration of heat at the hole mouth, with the material subjected to heat being able to expand freely.

The segments rest on the wheel 10 in the circumferential region 13 in which the web 12 of the wheel 10 is of such rigidity as not to undergo significant flexure on travelling along a bend, so preserving good planarity of the braking discs 16, 16'.

The appendices 25 of the braking discs located in the lesser rigidity region 14 of the web 12 can be of suitable shape and number, and enable the facing segments to be fixed together without those segments and their connections interfering with the wheel even during the flexure which this undergoes along a bend, so as not to influence the planarity of the discs as heretofore achieved.

The structure of the rotary support with braking discs according to the present invention is not limited to the aforegoing embodiments, and can undergo modifications within the capacity of the expert of the art, while remaining within the general scope of the present invention.

From the aforegoing description and illustrations, it can be seen that this wheel, leaving aside the small appendices arranged on the disc segments for connection purposes, comprises braking discs which are radially limited to the mere friction surface of the brake shoe and axially housed within the thickness of the wheel. This results in a very small unsuspended mass and also enables the entire space between the wheels to be used for installing the vehicle transmission members, for possible site installation of the discs there being required an axial space equal only to their thickness, without the need for any demounting of the delicate constituent parts of the transmission, which can hence be of considerable axial and radial size as the segments can be extracted radially and returned in the same manner.

The wheel according to the present invention is hence particularly suitable for railway locomotives with hollow shaft transmission. The ease of installation even in operation for any application pertaining to the railway field is of considerable benefit with an advantage in terms of time which makes the use of this rotary support with braking discs particularly convenient.

Moreover as the size of the segments can be chosen at will provided their number is an odd number other than one on each side of the wheel, a considerable advantage can be achieved in terms of the material and the particular method used to form them. In this respect, they represent parts which are of small dimensions compared with the corresponding elements of the state of the art, and hence easier to form in their semi-finished state, easily handled, of low cost because of the virtual elimination of rejects, and easy to machine using current CNC machines for series production.

The rotary support with braking discs according to the present invention satisfies the requirements of safety in particular at high train speeds.

It can also be provided with a further system for preventing rotation of the segments about the relative bolts, consisting of using the same aforesaid joining elements 36, 37 and 38, but providing them with circumferential surfaces radially facing the inner surfaces of the braking discs in correspondence with the circumferential ends of the segments.

In this manner, the rotary support with braking discs is doubly safe.

I claim:

1. A rotational body and brake disc assembly, comprising:

a rotational body having a central hub, a radially outer rim, and a web connecting said hub with said rim; said body having two axially opposite sides;

two brake discs, each constituted by a like odd number of at least three corresponding arranged arcuate segments, each segment having an axially inner side engaged with said web on a respective side of said body, a substantially planar outer side facing axially outwardly from a respective side of said web for engagement by a respective brake shoe, a radially inner arcuate edge and a radially outer arcuate edge which are arcuate about a longitudinal centerline of said rotational body and the respective one of said brake discs, and two angularly opposite ends;

a plurality of first openings axially through said web at corresponding locations relative to corresponding segments of said brake discs;

a plurality of first joining elements penetrating said web through respective ones of said first openings and rigidly joining corresponding ones of said brake disc segments to one another;

a plurality of second openings axially through said web at corresponding locations relative to corresponding segments of said brake discs;

a plurality of second joining elements penetrating respective ones of said second openings and rigidly fixing corresponding ones of said segments to said web;

each said disc normally having the segments thereof spaced from one another circumferentially of the rotational body, such that respective gaps exist between confronting respective ends of those of said segments thereof which neighbor one another circumferentially of the rotational body; and joining elements crossing respective ones of said gaps and joining respective ones of said segments of each disc which neighbor one another circumferentially of the rotational body, to one another.

2. The rotational body and brake disc assembly of claim 1, wherein:

each said segment has at least one socket formed in each said end thereof; and said joining elements crossing respective ones of said gaps comprise pins each slidingly received in a respective two of said sockets.

3. The rotational body and brake disc assembly of claim 1, wherein:

each said segment is provided with a radially inwardly extending appendage from the radially inner edge thereof, and a radially outwardly extending appendage from the radially outer edge thereof; and said plurality of first joining elements includes a first set which connects between the radially outwardly extending appendages of corresponding ones of said segments, and said plurality of second joining elements includes a first set which connects between the radially inwardly extending appendages of corresponding ones of said segments.

4. The rotational body and brake disc assembly of claim 3, wherein:

each said radially inwardly extending appendage is provided midway between said ends of the respective said brake disc segment.

5. The rotational body and brake disc assembly of claim 4, wherein:

each said radially outwardly extending appendage is provided midway between said ends of the respective said brake disc segment.

6. The rotational body and brake disc assembly of claim 3, wherein:

said plurality of first joining elements further includes a second set which clamps corresponding ones of said segments to one another at corresponding ends thereof.

7. The rotational body and brake disc assembly of claim 3, wherein:

said plurality of second joining elements further includes a second set which clamps corresponding ones of said segments to one another at corresponding ends thereof.

8. The rotational body and brake disc assembly of claim 3, wherein:

each said segment has at least one socket formed in each said end thereof; and said joining elements crossing respective ones of said gaps comprise pins each slidingly received in a respective two of said sockets;

radially outer ones of said pins each having a hole provided transversely therethrough;

said plurality of first joining elements further includes a second set each joining element of which is inserted in a corresponding two of said holes and bears against a respective two of the radially outer ones of said pins.

9. The rotational body and brake disc assembly of claim 1, wherein:

said web is provided integrally as one piece with said central hub and said rim.

10. The rotational body and brake disc assembly of claim 1, wherein:

said web comprises a radially inner circumferential band having relatively greater rigidity and a radially outer circumferential band having relatively lesser rigidity; said first openings being provided through said radially outer circumferential band, and said second openings being provided through said radially inner circumferential band.

11. The rotational body and brake disc assembly of claim 10, wherein:
said radially inner circumferential band of said web is thicker axially of said rotational body than is said radially outer circumferential band.

12. The rotational body and brake disc assembly of claim 10, wherein:
said radially inner circumferential band of said web has a lower modulus of elasticity than does said radially outer circumferential band.

13. The rotational body and brake disc assembly of claim 1, wherein:
said rotational body is a train wheel having a circumferentially extending running surface provided on said rim.

* * * * *